(12) United States Patent
Ichikura

(10) Patent No.: US 8,222,894 B2
(45) Date of Patent: Jul. 17, 2012

(54) SENSING APPARATUS FOR DETECTING LINEAR DISPLACEMENTS

(75) Inventor: Manabu Ichikura, Kanagawa (JP)

(73) Assignee: Tokyo Cosmos Electric Co., Ltd., Kanagawa (JP)

( * ) Notice: Subject to any disclaimer, the term of this patent is extended or adjusted under 35 U.S.C. 154(b) by 308 days.

(21) Appl. No.: 12/793,026

(22) Filed: Jun. 3, 2010

(65) Prior Publication Data

US 2010/0308806 A1    Dec. 9, 2010

(30) Foreign Application Priority Data

Jun. 9, 2009   (JP) ................................. 2009-138329

(51) Int. Cl.
     *G01B 7/14*        (2006.01)
(52) U.S. Cl. .............................. 324/207.24; 324/207.25
(58) Field of Classification Search ........................ None
See application file for complete search history.

(56) References Cited

U.S. PATENT DOCUMENTS 6,573,708 B1 *    6/2003   Hiramatsu et al. ....... 324/207.17

FOREIGN PATENT DOCUMENTS

JP      2001-127852      5/2000

* cited by examiner

*Primary Examiner* — Minh N Tang
(74) *Attorney, Agent, or Firm* — David N. Lathrop

(57) ABSTRACT

A sensing apparatus according to the present invention includes a movable part rotatably supported by a base, a first input unit that is part or all of a first member formed integrally with or secured to the movable part, a second input unit that is part or all of a second member formed integrally with or secured to the movable part, a turning member turning together with the movable part, and a sensing element that is secured to a reference position of the base, senses a direction of the turning member relative to the reference position, and outputs a signal determined on the basis of the detected direction to identify a first linear displacement and a second linear displacement.

11 Claims, 17 Drawing Sheets

SENSING APPARATUS FOR DETECTING LINEAR DISPLACEMENTS

BACKGROUND OF THE INVENTION

1. Field of the Invention

The present invention relates to a sensing apparatus that senses a linear displacement and, more particularly, to a sensing apparatus that senses a plurality of linear displacements.

2. Description of the Related Art

A sensing apparatus that senses a plurality of linear displacements is proposed (see Japanese Patent Application Publication No. 2000-127852, for example). This type of sensing apparatus typically has two sensing elements (potentiometers), each of which senses a separate linear displacement.

In a conventional sensing apparatus, since each of two sensing elements senses a separate linear displacement, variety in the sensing accuracies of the two sensing elements largely affects the sensing accuracy of the entire sensing apparatus. In addition, a conventional sensing apparatus incorporates two sensing elements, so the attachment and wiring of the sensing elements need to be performed in two places during assembly.

SUMMARY OF THE INVENTION

The present invention senses a first linear displacement along a first straight line and a second linear displacement along a second straight line, which differs from the first straight line. The sensing apparatus according to the present invention includes a base, a movable part capable of performing at least a first turn and a second turn, the movable part being rotatably supported by the base, the first turn being a turn about a third straight line, the second turn being a turn about a fourth straight line substantially orthogonal to the third straight line, a first input unit placed so as to turn the movable part about the third straight line when a force along the first straight line is applied to the first input unit, the first input unit being part or all of the first member formed integrally with or secured to the movable part, a second input unit placed so as to turn the movable part about the fourth straight line when a force along the second straight line is applied to the second input unit, the second input unit being part or all of the second member formed integrally with or secured to the movable part, a turning member secured to the movable part, the turning member turning together with the movable part, and a sensing element that is secured to a reference position of the base, senses a direction of the turning member relative to the reference position, and outputs a signal determined on the basis of the detected direction to identify the first linear displacement and the second linear displacement.

If a force along the first straight line is applied to the first input unit in response to the first linear displacement of any member, the movable part turns about the third straight line. If a force along the second straight line is applied to the second input unit in response to the second linear displacement of any member, the movable part turns about the fourth straight line. The third straight line and the fourth straight line are substantially orthogonal to each other and it is easy to separately extract the turning component of the movable part caused by the first linear displacement and the turning component of the movable part caused by the second linear displacement. Accordingly, the first linear displacement and the second linear displacement can easily be identified on the basis of the direction of the turning member that turns with the movable part. As a result, the sensing apparatus according to the present invention can easily sense two linear displacements with one sensing element.

DETAILED DESCRIPTION OF THE PREFERRED EMBODIMENT

Embodiments of the present invention will now be described with reference to the drawings.

First Embodiment

A first embodiment of the present invention will be described.

<Structure>

Figure 1:
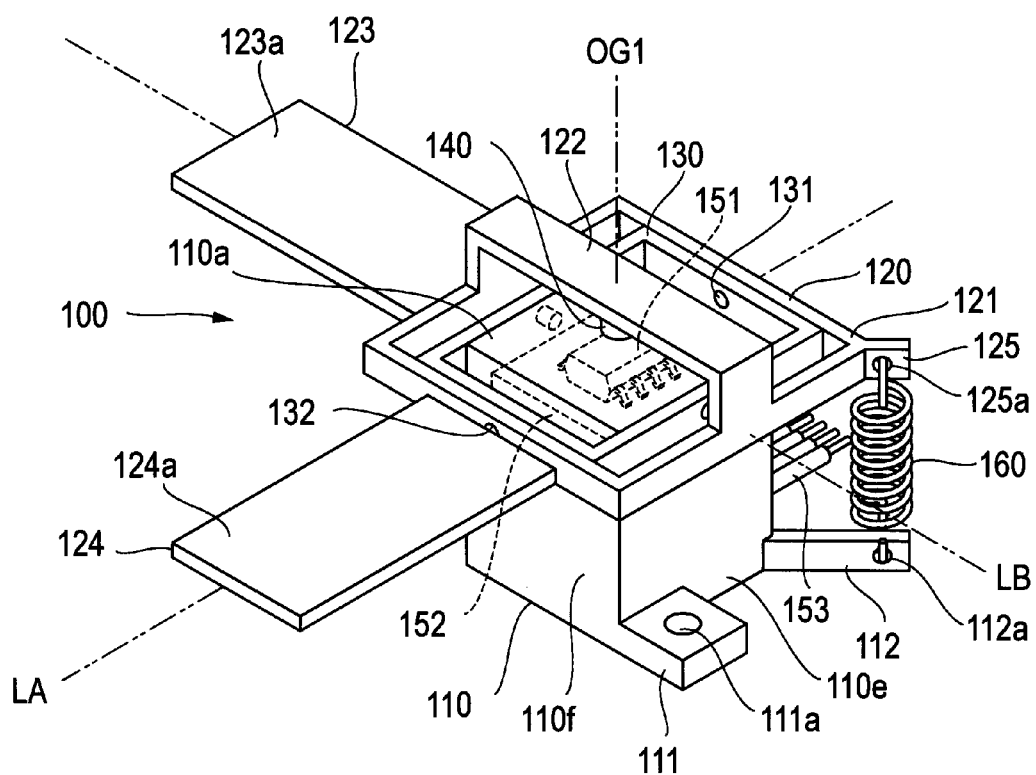
FIG. 1 is a perspective view illustrating a sensing apparatus according to a first embodiment.
Figure 2A:
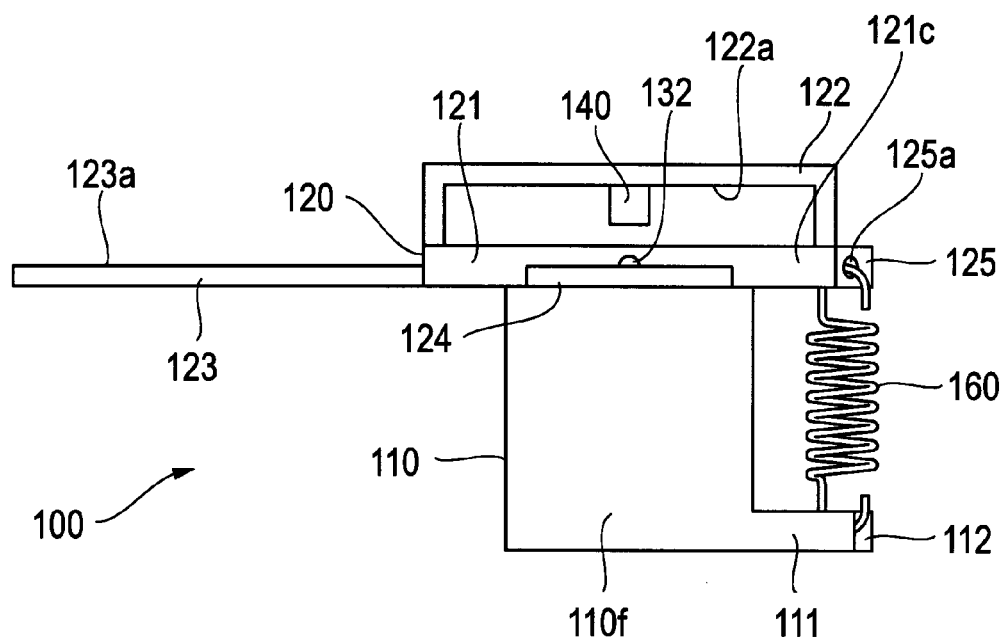
FIG. 2A is a front elevational view illustrating the sensing apparatus according to the first embodiment.
Figure 2B:
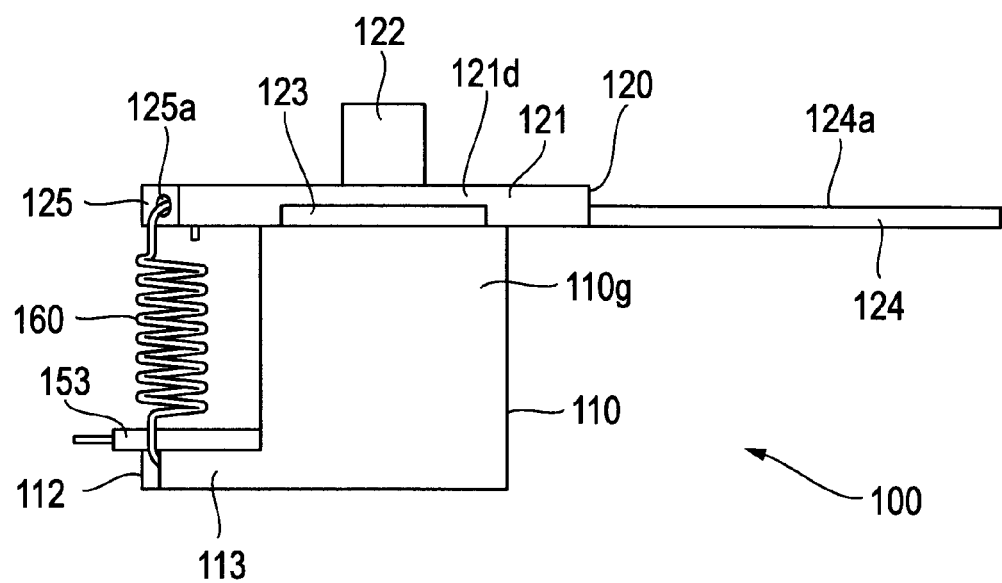
FIG. 2B is a left side elevational view illustrating the sensing apparatus according to the first embodiment.
Figure 3A:
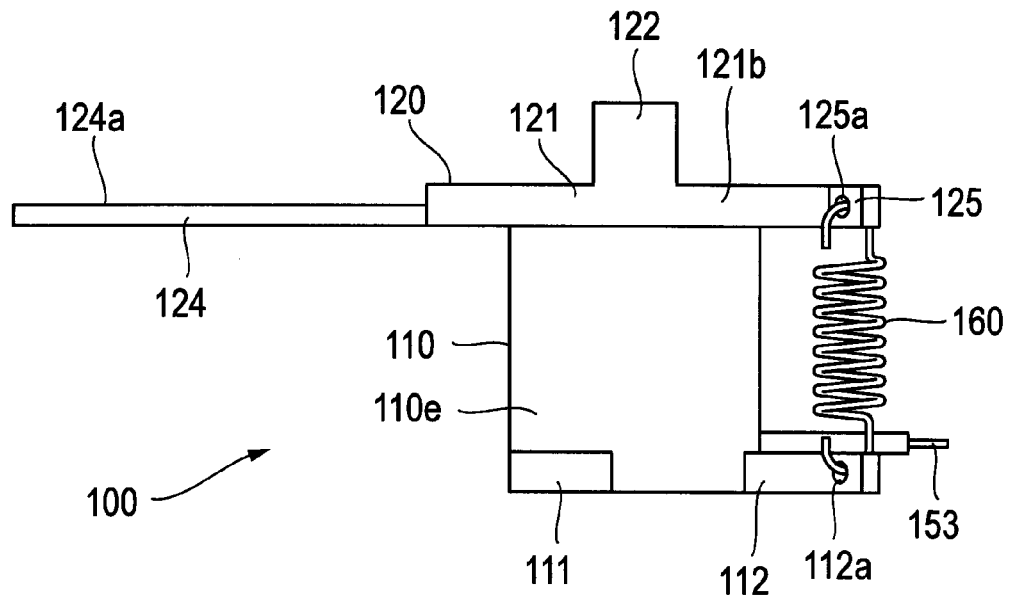
FIG. 3A is a right side elevational view illustrating the sensing apparatus according to the first embodiment.
Figure 3B:
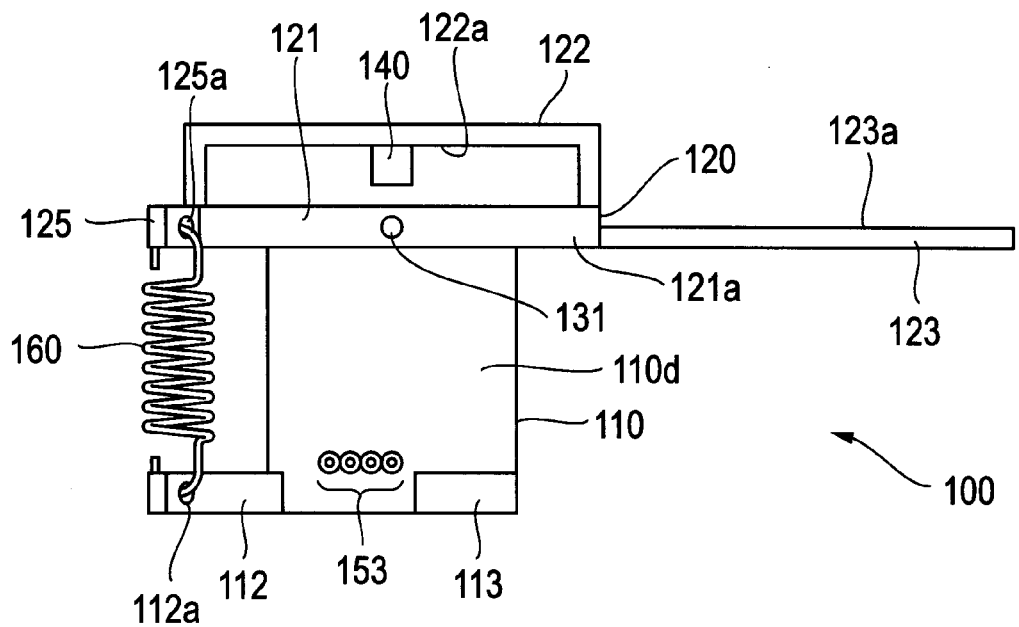
FIG. 3B is a back view illustrating the sensing apparatus according to the first embodiment.
Figure 4:
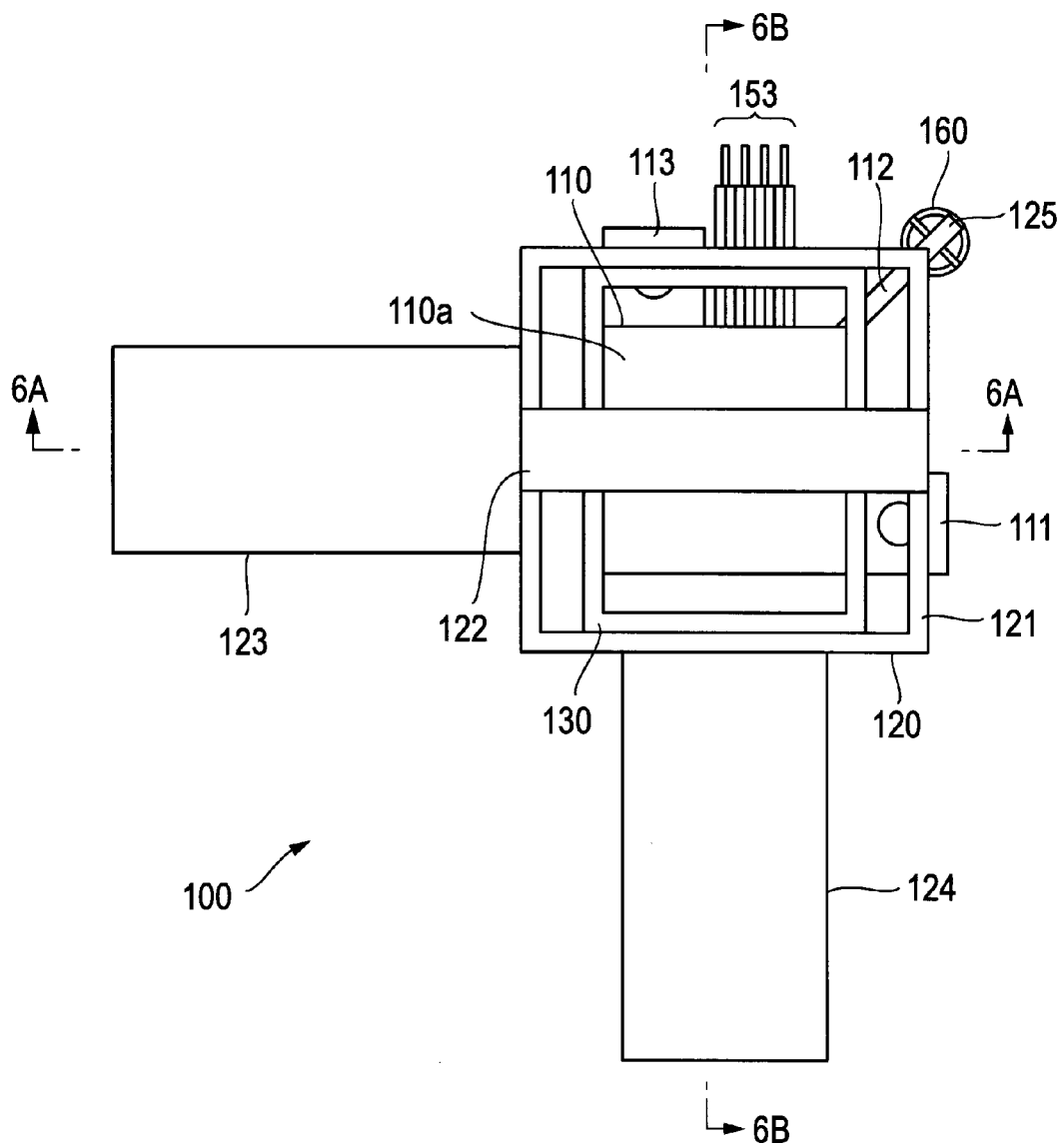
FIG. 4 is a plan view illustrating the sensing apparatus according to the first embodiment.
Figure 5:
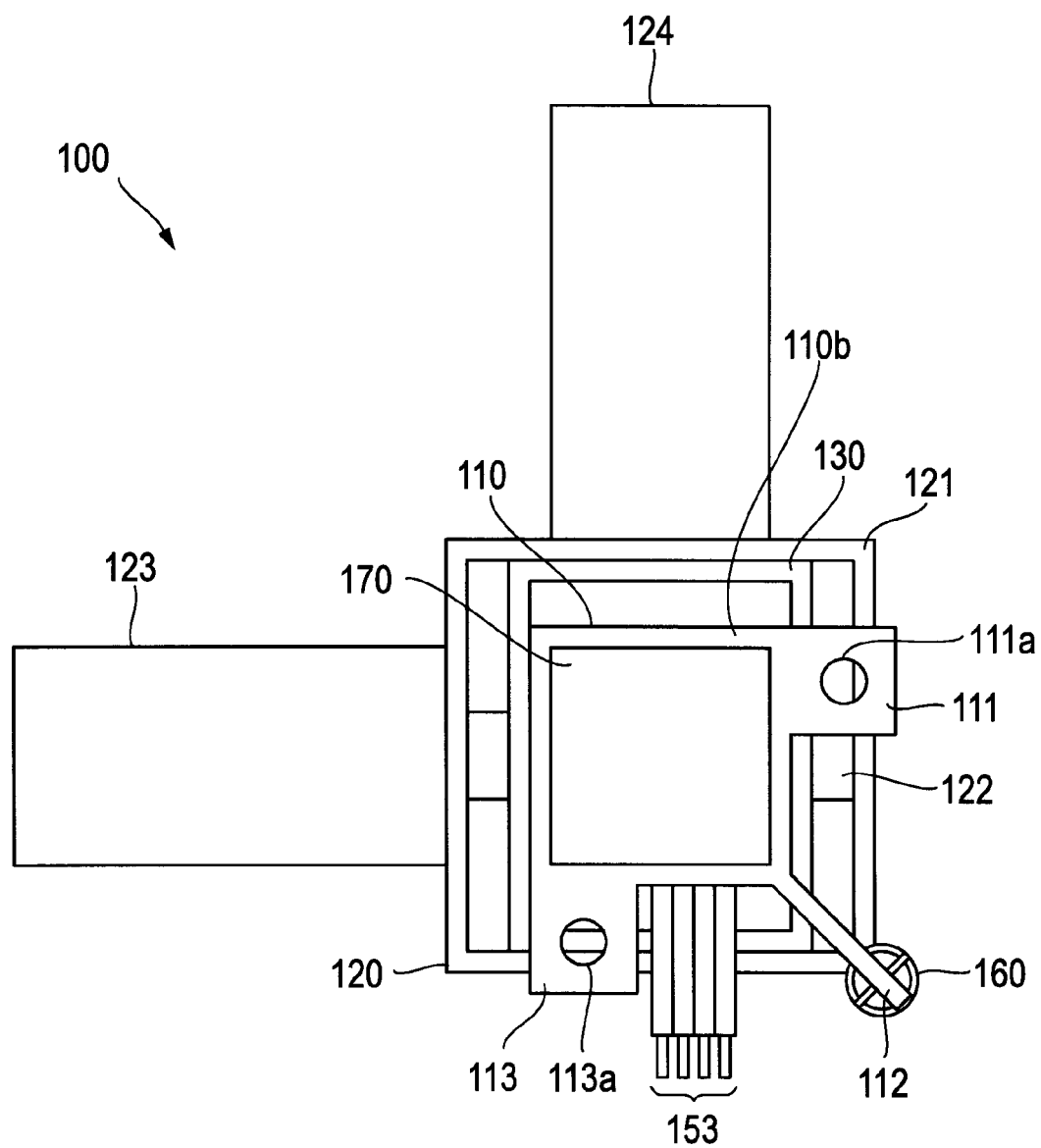
FIG. 5 is a bottom plan view illustrating the sensing apparatus according to the first embodiment.
Figure 6A:
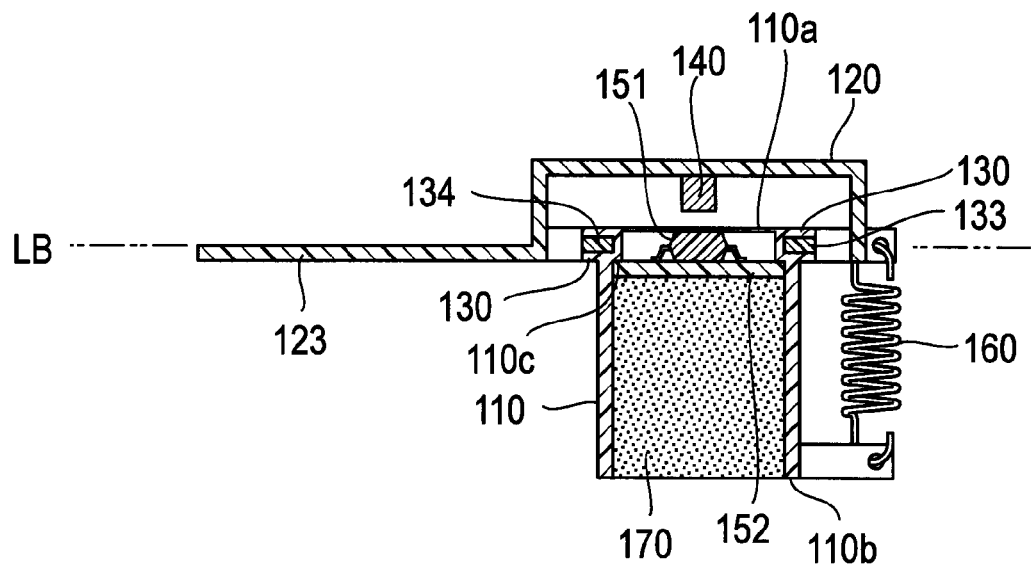
FIG. 6A is a cross-sectional view of section 6A-6A in FIG. 4.
Figure 6B:
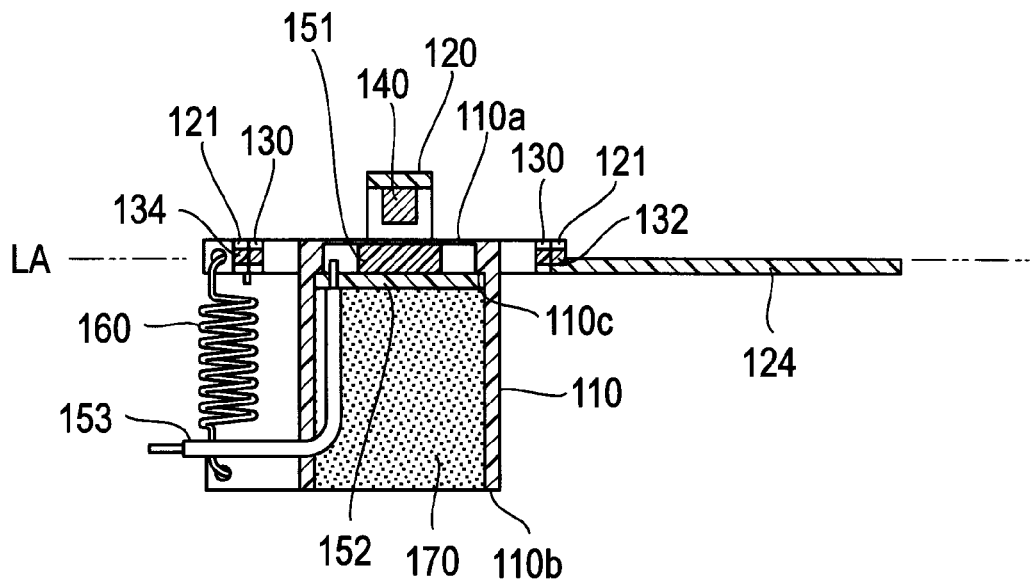
FIG. 6B is a cross-sectional view of section 6B-6B in FIG. 4.
Figure 7:
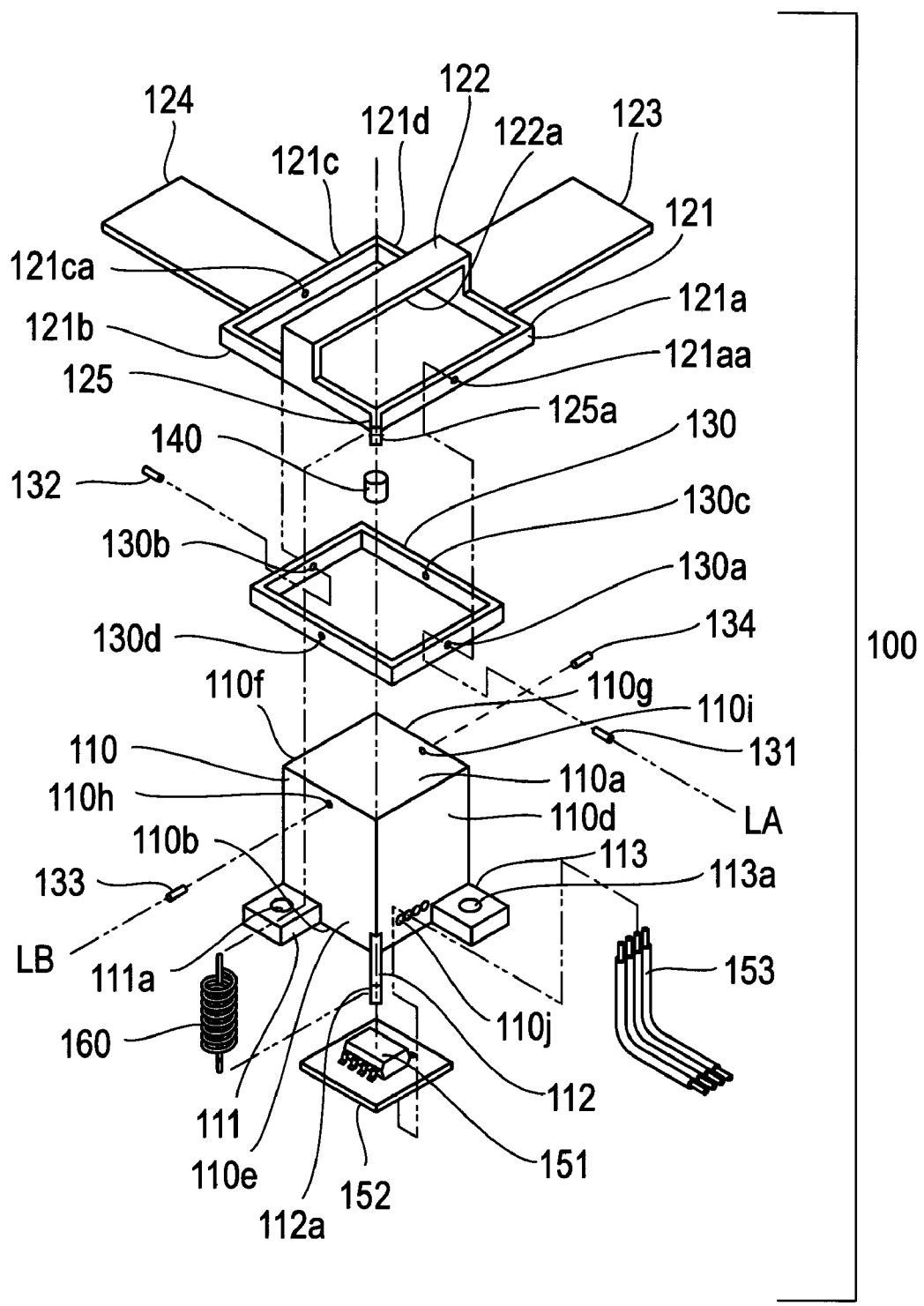
FIG. 7 is an exploded perspective view illustrating the sensing apparatus according to the first embodiment.

FIG. 1 is a perspective view of a sensing apparatus 100 according to the first embodiment. FIG. 2A is a front elevational view of the sensing apparatus 100 according to the embodiment, FIG. 2B is a left side elevational view of the sensing apparatus 100 according to the embodiment, FIG. 3A is a right side elevational view of the sensing apparatus 100 according to the embodiment, FIG. 3B is a back view of the sensing apparatus 100 according to the embodiment, FIG. 4 is a plan view of the sensing apparatus 100 according to the embodiment, and FIG. 5 is a bottom plan view of the sensing apparatus 100 according to the embodiment. FIG. 6A is a cross-sectional view of section 6A-6A in FIG. 4 and FIG. 6B is a cross-sectional view of section 6B-6B in FIG. 4. FIG. 7 is an exploded perspective view of the sensing apparatus 100 according to the embodiment.

As shown in these drawings, the sensing apparatus 100 according to the embodiment includes a base 110, movable parts 120 and 130, a magnet 140 (turning member), a sensor IC 151 (sensing element), a wiring board 152, lead wires 153, a spring 160 (elastic member), and a filling material 170.

[Base 110]

The base 110 according to the embodiment, which is made of synthetic resin etc., is a substantially rectangular-column-shaped hollow member that has four sides 110d to 110g, an end face 110a orthogonal to the four sides 110d to 110g, and an opening facing the end face 110a (see FIGS. 6A, 6B, and 7, etc.).

Shaft insertion holes 110h and 110i are disposed in the two mutually facing sides 110e and 110g, respectively, the shaft insertion holes 110h and 110i being close to the end face 110a and substantially orthogonal to the sides 110e and 110g, respectively. The shaft insertion holes 110h and 110i of the sides 110e and 110g are aligned in one straight line. A retaining part 110c projecting inward is disposed on an inner wall of each of the sides 110d to 110g, the retaining part 110c being close to the end face 110a (see FIGS. 6A and 6B). Substantially vertical, substantially orthogonal, substantially parallel, and substantially identical are virtually the same as vertical, orthogonal, parallel, and identical as long as the effects of the present invention can be obtained.

In the vicinity of an end face 110b facing the end face 110a, a rectangular spring retainer 112 (first retainer), which projects outward from an edge at which the sides 110e and 110d mutually intersect, a retaining plate 111, which projects substantially orthogonally to the side 110e from the side 110e, and a retaining plate 113, which projects substantially orthogonally to the side 110d from the side 110d are present. In the embodiment, the angle formed by the side 110e and the spring retainer 112 is substantially identical to the angle formed by the side 110d and the spring retainer 112. The spring retainer 112 may be formed integrally with the base 110 or secured to the based 110. A spring retaining hole 112a, a through hole, is formed in the spring retainer 112. In addition, retaining holes 111a and 113a, through holes in a direction orthogonal to the end faces 110a and 110b are formed in the retaining plates 111 and 113, respectively. Through holes 110j, through which the lead wires 153 are passed, are formed in the side 110d.

[Movable Parts 120 and 130]

The movable part 130 according to the embodiment, which is made of synthetic resin etc., is a frame that surrounds the sides 110d to 110g (see FIGS. 1, 4, and 7).

Shaft insertion holes 130a to 130d are formed in four sides of the frame of the movable part 130. In the embodiment, the shaft insertion holes 130a to 130d are formed near the center of the four sides of the frame of the movable part 130. The mutually facing shaft insertion holes 130a and 130b are aligned in a straight line and the mutually facing shaft insertion holes 130c and 130d are aligned in another straight line substantially orthogonal to the straight line.

The inner dimension between the shaft insertion holes 130a and 130b of the movable part 130 is larger than the outer dimension between the sides 110d and 110f of the base 110; the inner dimension between the shaft insertion holes 130c and 130d of the movable part 130 is slightly larger than the outer dimension between the sides 110e and 110g of the base 110. The movable part 130 is placed so that it surrounds the sides 110d to 110g and the shaft insertion holes 130c and 130d of the movable part 130 and the shaft insertion holes 110h and 110i of the base 110 are aligned in a straight line LB. A cylindrical shaft 133 is inserted into the shaft insertion hole 130d of the movable part 130 and the shaft insertion hole 110h of the base 110 and a cylindrical shaft 134 is inserted into the shaft insertion hole 130c of the movable part 130 and the shaft insertion hole 110i of the base 110. Accordingly, the movable part 130 is attached to the base 110 rotatably about the cylindrical shafts 133 and 134.

The movable part 120 according to the embodiment, which is made of synthetic resin etc., includes a rectangular frame 121 surrounding the movable part 130 surrounding the sides 110d to 110g of the base 110, a plate-like input unit 123 (first input unit) and a plate-like input unit 124 (second input unit), which project outward from to mutually-orthogonal sides 121d and 121c of the four sides 121a to 121d of the frame 121, a rectangular spring retainer 125 (second retainer), which projects outward from an edge at which mutually-orthogonal sides 121a and 121b intersect, and a bridge 122 connecting, on one opening side, mutually-facing sides 121b and 121d (see FIGS. 4, 7, etc.).

Of the four sides 121a to 121d of the frame 121, the mutually facing sides 121a and 121c have shaft insertion holes 121aa and 121ca, through holes, respectively. In the embodiment, the shaft insertion holes 121aa and 121ca are formed near the centers of the sides 121a and 121c, respectively, so as to be aligned in a straight line. The inner dimension between the sides 121a and 121c of the frame 121 is larger than the outer dimension the shaft insertion holes 130a and 130b of the movable part 130; the inner dimension between the sides 121b and 121d of the frame 121 is larger than the outer dimension between the shaft insertion holes 130c and 130d of the movable part 130. The frame 121 surrounds the four sides of the frame of the movable part 130 and is placed so that the shaft insertion holes 121aa and 121ca of the frame 121 and the shaft insertion holes 130a and 130b of the movable part 130 are aligned in a straight line LA. A cylindrical shaft 131 is inserted into the shaft insertion hole 121aa of the frame 121 and the shaft insertion hole 130a of the movable part 130. A cylindrical shaft 132 is inserted into the shaft insertion hole 121ca of the frame 121 and the shaft insertion hole 130b of the movable part 130. Accordingly, the frame 121 is attached to the movable part 130 rotatably about the cylindrical shafts 131 and 132. The straight line LA is substantially orthogonal to the straight line LB above and, particularly in the embodiment, the straight lines LA and LB are present on substantially the same plane.

The input unit 124 is part or all of a member formed integrally with the movable part 120 and extends outward from the side 121c having the shaft insertion hole 121ca in a direction substantially orthogonal to the side 121c. That is, the input unit 124 extends along the straight line LA (FIG. 1) from the movable part 120. The input unit 123 is part or all of a member formed integrally with the movable part 120 and extends outward from the side 121d not having the shaft insertion hole 121aa or 121ca in a direction substantially orthogonal to the side 121d. That is, the input unit 123 extends along the straight line LB (FIG. 1) from the movable part 120.

The spring retainer 125 extends outward from the movable part 120 in a direction between the direction opposite to the extension direction of the input unit 123 and the direction opposite to the extension direction of the input unit 124 (FIGS. 1, 4, etc.). The spring retainer 125 may be formed integrally with or secured to the movable part 120. A spring retaining hole 125a, a through hole, is formed in the spring retainer 125.

A bridge 122 has a rectangular plate substantially parallel to an opening end of the frame 121 and two mutually-parallel legs extending toward the frame 121, the legs being substantially orthogonal to the rectangular plate from both ends of the rectangular plate. The legs are secured to or formed integrally with one opening end of the frame 121.

With the above structure, the movable part 120 are supported rotatably by the base 110 through the movable part 130, enabling at least a turn about the straight line LA (third straight line) and a turn about the straight line LB (fourth straight line), which is substantially orthogonal to the straight line LA (see FIG. 1 etc.). The movable part 120 according to the embodiment can also turn about the straight line LA and turn about the straight line LB at the same time. Accordingly, the movable part 120 can tilt in any direction relative to a straight line OG1, which is determined relative to the base 110. The straight line OG1 in the embodiment is substantially orthogonal to the end face 110a of the base 110.

[Magnet 140]

The magnet 140 is secure to an under surface 122a of the bridge 122 of the movable part 120 (FIGS. 2A, 3B, etc.). In the embodiment, either pole (south pole or north pole) of the magnet 140 is attached to substantially the center of the under surface 122a. The magnet 140 turns together with the movable part 120 and, when the under surface 122a of the bridge 122 is substantially parallel to the end face 110a of the base 110, the magnet 140 is placed in the straight line OG1, which is substantially orthogonal to both the straight lines LA and LB and substantially orthogonal to the end face 110a of the base 110. The magnet 140 may be a rare-earth magnet such as SmCo or a ferrite magnet.

[Sensor IC 151, Wiring Board 152, Lead Wire 153, and Filling Material 170]

The sensor IC 151 according to the embodiment is a magnetic sensor circuit with a sensing unit sensing a magnetic field generated by the magnet 140. The sensor IC 151 senses the orientation of the magnet 140 relative to the reference position of the base 110 by sensing the direction in which a magnetic field line from the magnet 140 passes through the sensing unit. An example of the sensor IC 151 is an element that includes a plurality of Hall elements or magnetoresistive elements (sensing unit), calculates output signals from the elements, and outputs, as two signals, information for identifying the direction in which a magnetic field passes through the sensor IC 151. A specific example of the sensor IC 151 of this type is the MLX90333 manufactured by Melexis.

The sensor IC 151 is mounted on one side of the wiring board 152 to which one end of each of the lead wires 153 is connected. The wiring board 152 of this type is placed within the based 110 with the sensor IC 151 facing the end face 110a (see FIGS. 6 and 7). The wiring board 152 is positioned within the base 110 by the retaining part 110c. In the embodiment, the sensor IC 151 is mounted near the center of one surface of the wiring board 152 so that the wiring board 152 and the end face 110a are substantially parallel to each other. Another end of each of the lead wires 153 passes through a corresponding through hole 110j formed in the side 110d of the base 110 toward the outside of the base 110. In this state, the base 110 is filled with the filling material 170 to secure the wiring board 152. Accordingly, the sensor IC 151 is secured to the predetermined reference position of the base 110 so as to be spaced apart from the magnet 140. The reference position in the embodiment is established in the straight line OG1.

[Spring 160]

The spring 160 is disposed between the base 110 and the movable part 120. The spring 160 of the embodiment is a coil spring (coil-shaped extension spring), both ends of which are bent to a hook or ring shape. One end of the spring 160 snaps into the spring retaining hole 112a of the spring retainer 112 of the base 110 and the other end of the spring 160 snaps into the spring retaining hole 125a of the spring retainer 125 of the movable part 120 (see FIG. 1 etc.). The elastic force of the spring 160 pushes the spring retainer 125 of the movable part 120 in a direction from the spring retainer 125 to the spring retainer 112 of the base 110.

<Operation>

FIGS. 8, 9A to 9F, and 10A to 10D describe the operation of the sensing apparatus 100 according to the first embodiment. FIG. 11 describes the sensing operation of the sensor IC 151.

Figure 8:
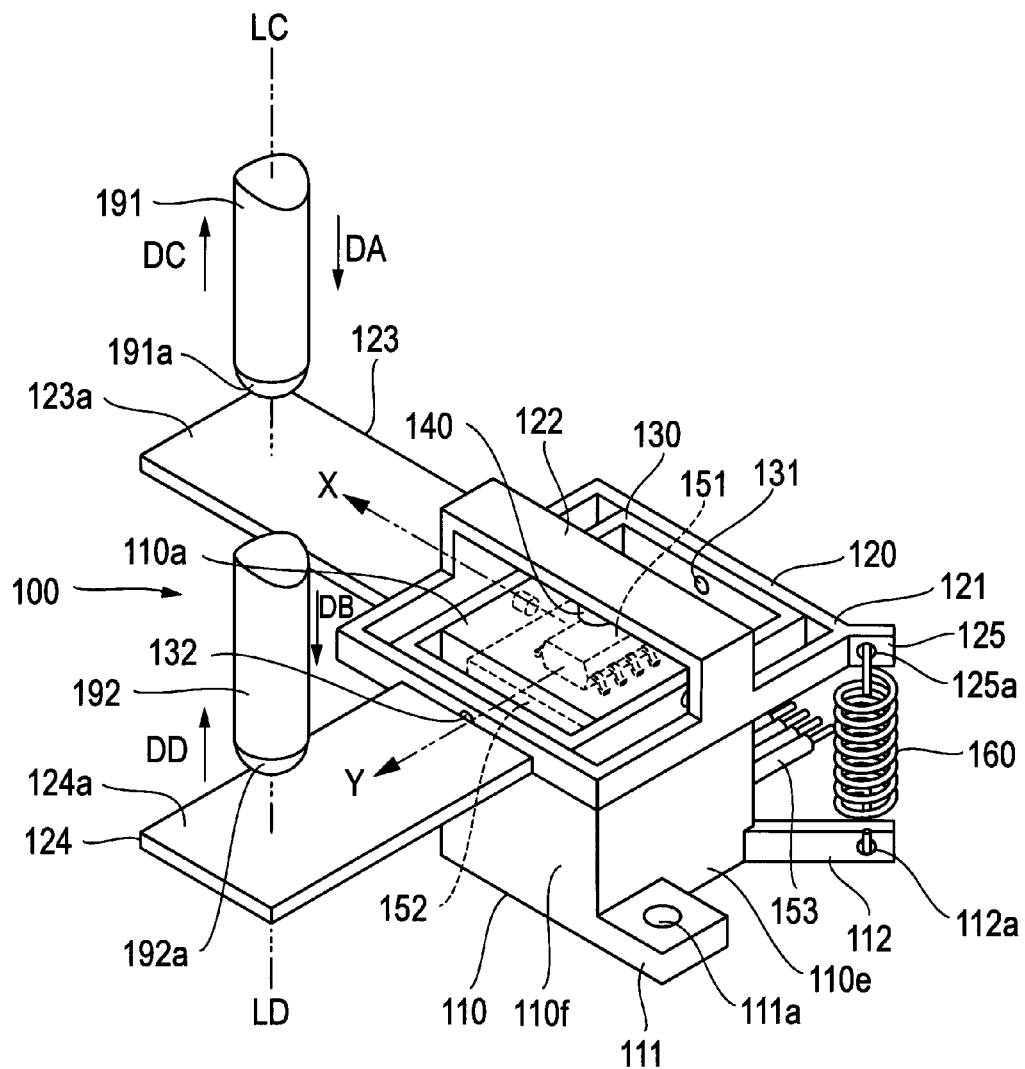
FIG. 8 is a diagram illustrating the operation of the sensing apparatus according to the first embodiment.

As shown in FIG. 8, when the sensing apparatus 100 according to the embodiment is used, a tip 191a of an input shaft 191, which moves linearly in the direction of a straight line LC (first straight line), makes contact with one surface 123a of the input unit 123 of the sensing apparatus 100 and a tip 192a of an input shaft 192, which moves linearly in the direction of a straight line LD (second straight line), makes contact with one surface 124a of the input unit 124. In the embodiment, the surface 123a and the surface 124a face in the same direction as the end face 110a of the base 110. The straight lines LC and LD are substantially parallel to each other and substantially orthogonal to the end face 110a of the base 110. The tips 191a and 192a are both hemispherical.

When the input shaft 191 moves linearly in the DA direction along the straight line LC (first linear displacement) and the tip 191a of the input shaft 191 applies a force in the DA direction (first direction) along the straight line LC, the movable part 120 turns in the DA direction about the straight line LA (third straight line). Accordingly, the spring 160 gives a reaction force against the turning of the movable part 120 in the DA direction about the straight line LA. That is, the spring 160 applies, to the movable part 120, a force in the direction opposite to the direction in which the movable part 120 turns when a force in the DA direction is applied to the input unit 123. This reaction force urges the tip 191a of the input shaft 191 in the DC direction, which is opposite to the DA direction, from the surface 123a along the straight line LC. This brings the input shaft 191 into constant contact with the input unit 123 and, even when the input shaft 191 moves linearly in the DC direction along the straight line LC, the input unit 123 follows the linear displacement of the tip 191a and the movable part 120 turns in the DC direction about the straight line LA.

When the input shaft 192 moves linearly in the DB direction along the straight line LD (second linear displacement) and the tip 192a of the input shaft 192 applies a force in the DB direction (second direction) along the straight line LD, the movable part 120 turns in the DB direction about the straight line LB (fourth straight line). Accordingly, the spring 160 gives a reaction force against the turning of the movable part 120 in the DB direction about the straight line LB. That is, the spring 160 applies, to the movable part 120, a force in the direction opposite to the direction in which the movable part 120 turns when a force in the DB direction is applied to the input unit 124. This reaction force urges the tip 192a of the input shaft 192 in the DD direction, which is opposite to the DB direction, from the surface 124a of the input unit 124 along the straight line LD. This brings the input shaft 192 into constant contact with the input unit 124 and, even when the input shaft 192 moves linearly in the DD direction along the straight line LD, the input unit 124 follows the linear displacement of the tip 192a and the movable part 120 turns in the DD direction about the straight line LB. As shown in FIG. 8 etc., the DA direction is substantially identical to the DB direction and the DC direction is substantially identical to the DD direction.

When the input shaft 191 and 192 move linearly at the same time, the above turning operations of the movable part 120 are performed at the same time. Since the tips 191a and 192a of the input shaft 191 and 192 are formed hemispherically, when the movable part 120 turns based on the linear displacement of the input shaft 191, the turning operation is not limited by the tip 192a of the input shaft 192. Similarly, when the movable part 120 turns based on the linear displacement of the input shaft 192, the turning operation is not limited by the tip 191a of the input shaft 191.

The magnet 140 attached to the movable part 120 can be placed in the straight line OG1. Depending on the turning operation of the movable part 120, the tilt direction and the tilt angle of a straight line passing through the magnet 140 and the reference position in which the sensor IC 151 is placed change relative to the straight line OG1. In the embodiment, the straight lines LC and LD are substantially parallel to each other and the DA direction and the DB direction are substantially the same. The spring 160 applies a force including the direction components in the DA direction and the DB direction to the spring retainer 125. Since the spring retainers 112 and 125 and the spring 160 are placed in the above positions, the single spring 160 gives a reaction force against the turning of the movable part 120 in the DA direction about the straight line LA (third straight line) and a reaction force against the turning of the movable part 120 in the DB direction about the straight line LB (fourth straight line).

Next, the turning operation of the movable part 120 in response to the linear displacement of the input shafts 191 and 192 will be described with reference to FIGS. 9A to 9F.

Figure 9A:
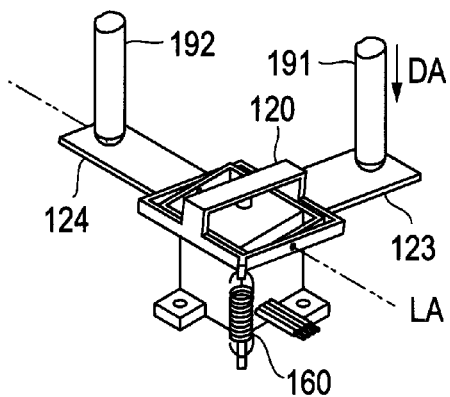
FIG. 9A is a diagram illustrating the operation of the sensing apparatus according to the first embodiment.
Figure 9B:
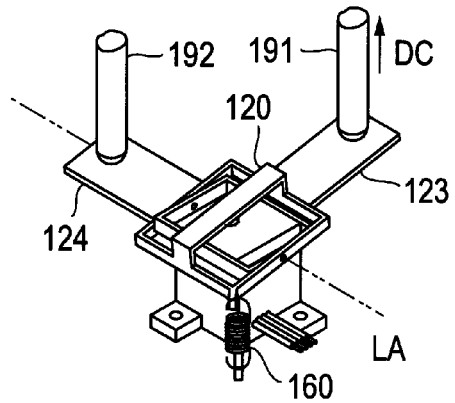
FIG. 9B is a diagram illustrating the operation of the sensing apparatus according to the first embodiment.

When the input shaft 191 moves linearly in the DA direction along the straight line LC and the input shaft 191 applies, to the input unit 123, a force in the DA direction along the straight line LC, the movable part 120 turns in the DA direction about the straight line LA (FIG. 9A). When the input shaft 191 moves linearly in the DC direction along the straight line LC, the movable part 120 turns in the DC direction about the straight line LA (FIG. 9B).

Figure 9C:
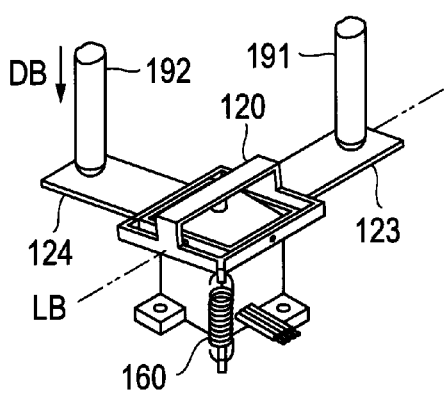
FIG. 9C is a diagram illustrating the operation of the sensing apparatus according to the first embodiment.
Figure 9D:
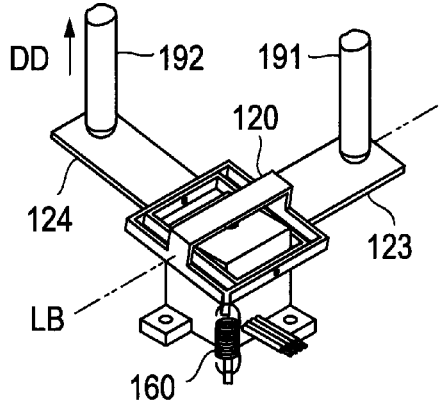
FIG. 9D is a diagram illustrating the operation of the sensing apparatus according to the first embodiment.

When the input shaft 192 moves linearly in the DB direction along the straight line LD and the input shaft 192 applies, to the input unit 124, a force in the DB direction along the straight line LD, the movable part 120 turns in the DB direction about the straight line LB (FIG. 9C). When the input shaft 192 moves linearly in the DD direction along the straight line LD, the movable part 120 turns in the DD direction about the straight line LB (FIG. 9D).

Figure 9E:
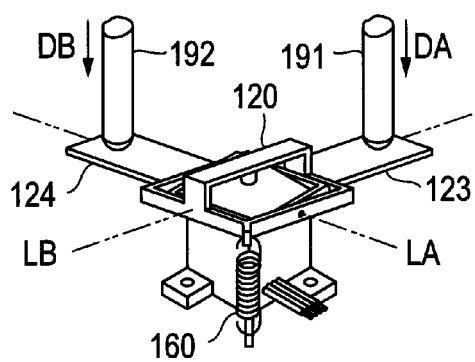
FIG. 9E is a diagram illustrating the operation of the sensing apparatus according to the first embodiment.
Figure 9F:
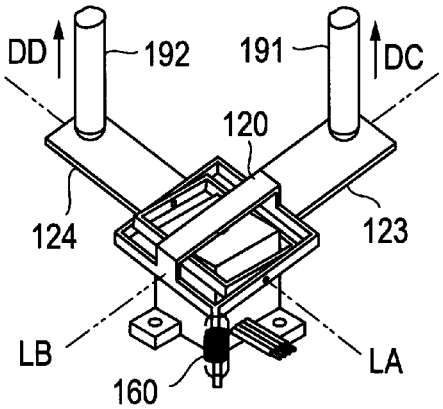
FIG. 9F is a diagram illustrating the operation of the sensing apparatus according to the first embodiment.

When the input shaft 191 moves linearly in the DA direction along the straight line LC, the input shaft 192 moves linearly in the DB direction along the straight line LD, the input shaft 191 applies, to the input unit 123, a force in the DA direction along the straight line LC, and the input shaft 192 applies, to the input unit 124, a force in the DB direction along the straight line LD, the movable part 120 turns in the DB direction about the straight line LB while turning in the DA direction about the straight line LA (FIG. 9E). When the input shaft 191 moves linearly in the DC direction along the straight line LC and the input shaft 192 moves linearly in the DD direction along the straight line LD, the movable part 120 turns in the DD direction about the straight line LB while turning in the DC direction about the straight line LA (FIG. 9F).

Figure 10A:
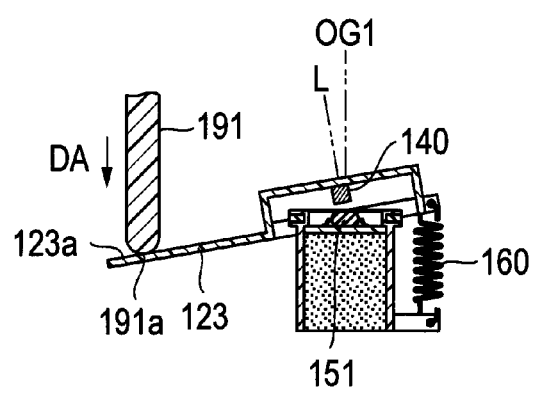
FIG. 10A is a diagram illustrating the operation of the sensing apparatus according to the first embodiment.
Figure 10B:
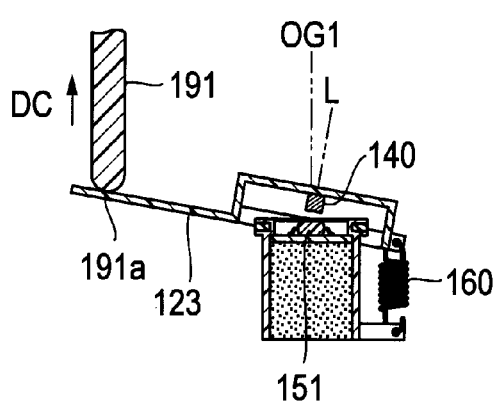
FIG. 10B is a diagram illustrating the operation of the sensing apparatus according to the first embodiment.
Figure 10C:
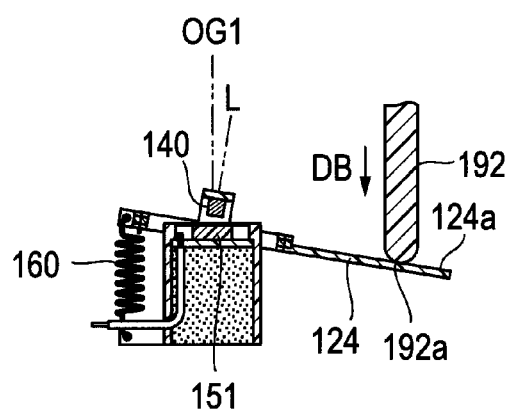
FIG. 10C is a diagram illustrating the operation of the sensing apparatus according to the first embodiment.
Figure 10D:
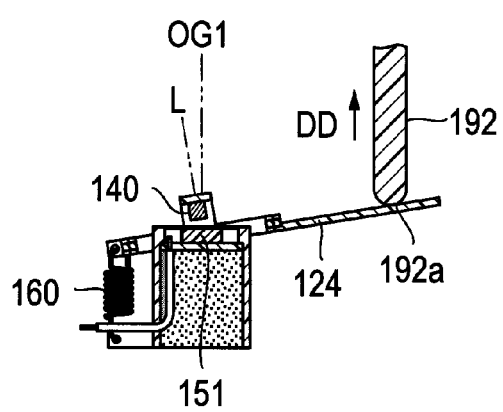
FIG. 10D is a diagram illustrating the operation of the sensing apparatus according to the first embodiment.

Next, the turning operation of the movable part 120 and the turning operation of the magnet 140 in response to the linear displacement of the input shafts 191 and 192 will be described with reference to FIGS. 10A to 10D. FIG. 10A is a cross-sectional view illustrating the state in FIG. 9A, FIG. 10B is a cross-sectional view illustrating the state in FIG. 9B, FIG. 10C is a cross-sectional view illustrating the state in FIG. 9C, and FIG. 10D is a cross-sectional view illustrating the state in FIG. 9D. FIGS. 10A and 10B are cross-sectional views of section 6A-6A in FIG. 4, and FIGS. 10C and 10D are cross-sectional views of section 6B-6B in FIG. 4.

When the input shaft 191 or 192 moves linearly and the movable part 120 turns, as shown in FIGS. 10A to 10D, the direction of magnet 140 (turning member) relative to the reference position (position in which the sensor IC 151 is placed) changes. That is, when the input shaft 191 or 192 moves linearly, the tilt direction and the tilt angle of a straight line L passing through the magnet 140 and the reference position (position in which the sensor IC 151 is placed) relative to the straight line OG1 change. This tilt direction depends on the ratio between the linear displacement of the input shaft 191 and the linear displacement of the input shaft 192; this tilt angle depends on the absolute values of the linear displacement of the input shaft 191 and the linear displacement of the input shaft 192.

The sensor IC 151 according to the embodiment outputs an X-axis output signal value and a Y-axis output signal value as signals to identify the first linear displacement and second linear displacement. The X-axis output signal value identifies an X-axis component of a direction component on an XY plane (XY plane defined relative to the base 110), the Y-axis output signal value identifies a Y-axis component of the direction component on the XY plane. The direction component corresponds to a projection, on the XY plane, of the direction of the magnet 140 (turning member) relative to the reference position (position in which the sensor IC 151 is placed). In other words, the direction component corresponds to an image that is projected on the XY plane from the direction of the magnet 140 relative to the reference position. An example of the direction component is a projection, on the XY plane, of the direction of the magnet 140 relative to the reference position. The XY plane is substantially orthogonal to one straight line OG1 capable of being substantially orthogonal to the straight line LA (third straight line) and the straight line LB (fourth straight line). A specific example of this will be described with reference to the FIGS. 11A and 11B.

Figure 11A:
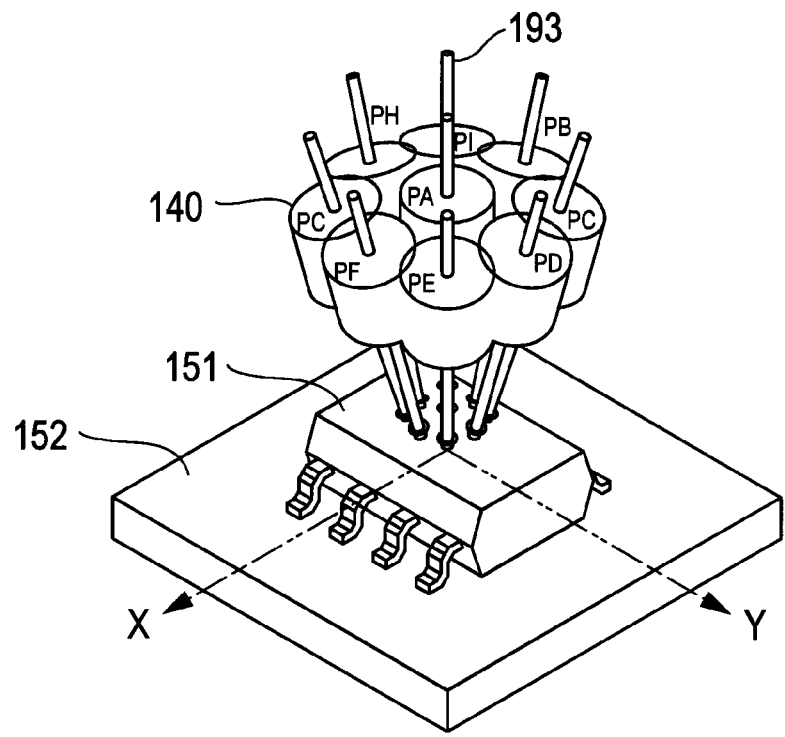
FIG. 11A is a diagram illustrating the sensing operation of a sensor IC.

FIG. 11A illustrates the positions of the magnet 140 and the sensor IC 151 in response to the turning of the movable part 120. In FIG. 11A, the position of the magnet 140 with the magnet 140 placed in the straight line OG1 is PA and the positions of magnet 140 with the magnet 140 tilted by the same amount in eight directions from the center are PB, PC, PD, PE, PF, PG, PH, and PI. The hollow arrows 193 in FIG. 11A indicate the center of a magnetic field line from the magnet 140 located in each of positions PA to PI. The components indicated by these arrows 193 are equivalent to the direction components that identify the directions of the magnets 140 (turning members) relative to the reference position (position in which the sensor IC 151 is placed).

As shown in this figure, the direction in which the magnetic field line from the magnet 140 passes the sensing part of the sensor IC 151 differs for each of the positions PA to PI of the magnet 140 relative to the sensor IC 151. The sensor IC 151 in FIG. 11 projects the direction component of the center of a magnetic field line passing through this sensing unit on an XY plane parallel to the end face 110a of the base 110, represents the direction component of the center of the magnetic field line projected on the XY plane using the output voltage of the X-axis output signal corresponding to the X-axis and the output voltage of the Y-axis output signal corresponding to the Y-axis, and outputs the X-axis output signal and the Y-axis output signal. When the movable part 120 is placed in a certain position relative to the base 110, if the input unit 123 can be part or all of the member extending along the X-axis of the XY plane and the input unit 124 can be part or all of the member extending along the Y-axis of the XY plane (FIG. 8, 11, etc.), for example, the X-axis output signal identifies only the first linear displacement along the straight line LC and the Y-axis output signal identifies only the second linear displacement along the straight line LD.

Figure 11B:
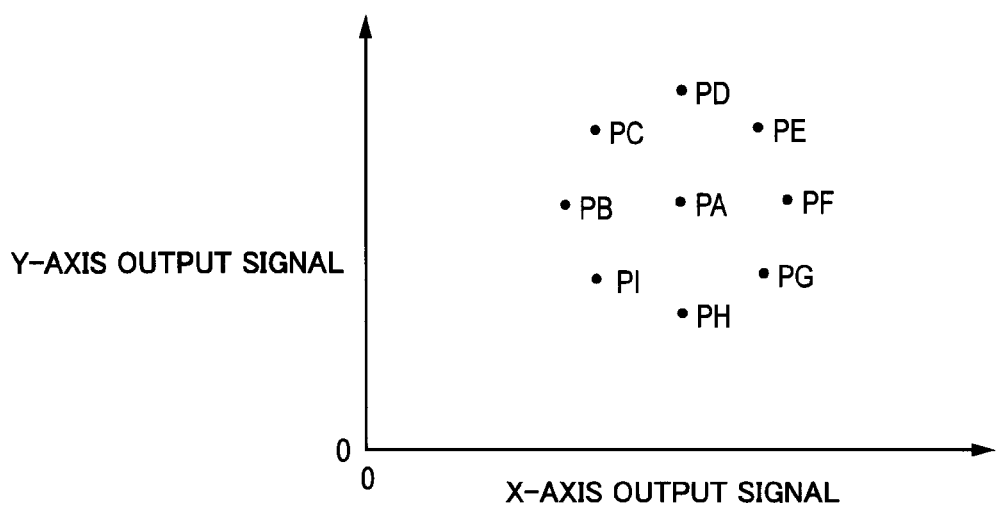
FIG. 11B is a diagram illustrating the sensing operation of the sensor IC.

FIG. 11B shows the voltages of the X-axis output signal and the Y-axis output signal output from the sensor IC 151 when the voltage of the X-axis output signal increases as the magnet 140 turns in the PF direction and the voltage of the Y-axis output signal increases as the magnet 140 turns in the PD direction. When the voltages of the X-axis output signal and the Y-axis output signal are set in this way, the two linear displacements of the input axes 191 and 192 can be sensed.

Second Embodiment

Next, a second embodiment of the present invention will be described. The second embodiment is a modification of the first embodiment and includes a base and a movable part connected with a ball joint to turn a magnet, which is a turning member. The structure of a sensing apparatus, which is a difference with the first embodiment, will be mainly described.

<Structure>

Figure 12:
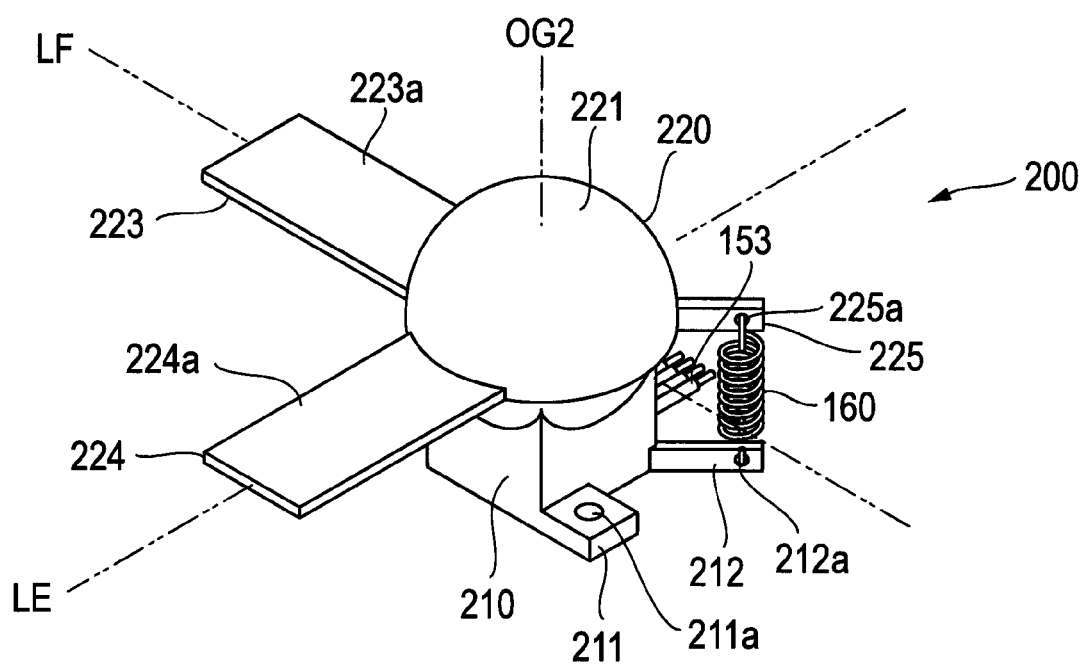
FIG. 12 is a perspective view illustrating a sensing apparatus according to a second embodiment.
Figure 13A:
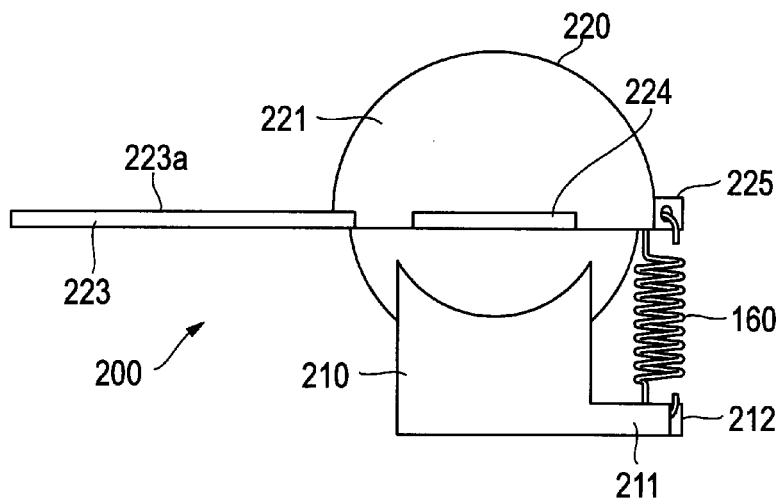
FIG. 13A is a front elevational view illustrating the sensing apparatus according to the second embodiment.
Figure 13B:
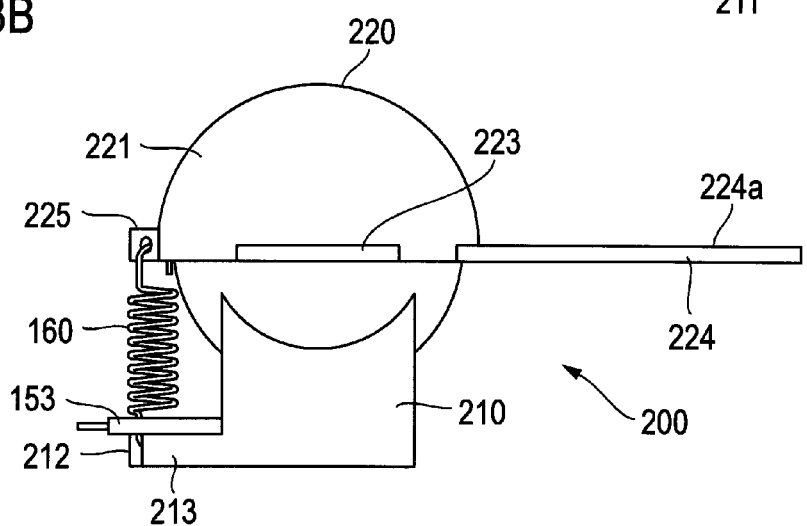
FIG. 13B is a left side elevational view illustrating the sensing apparatus according to the second embodiment.
Figure 13C:
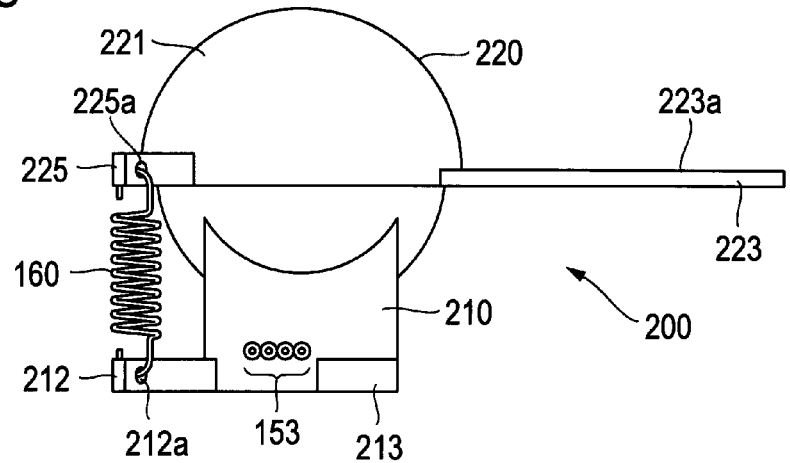
FIG. 13C is a back view illustrating the sensing apparatus according to the second embodiment.
Figure 14A:
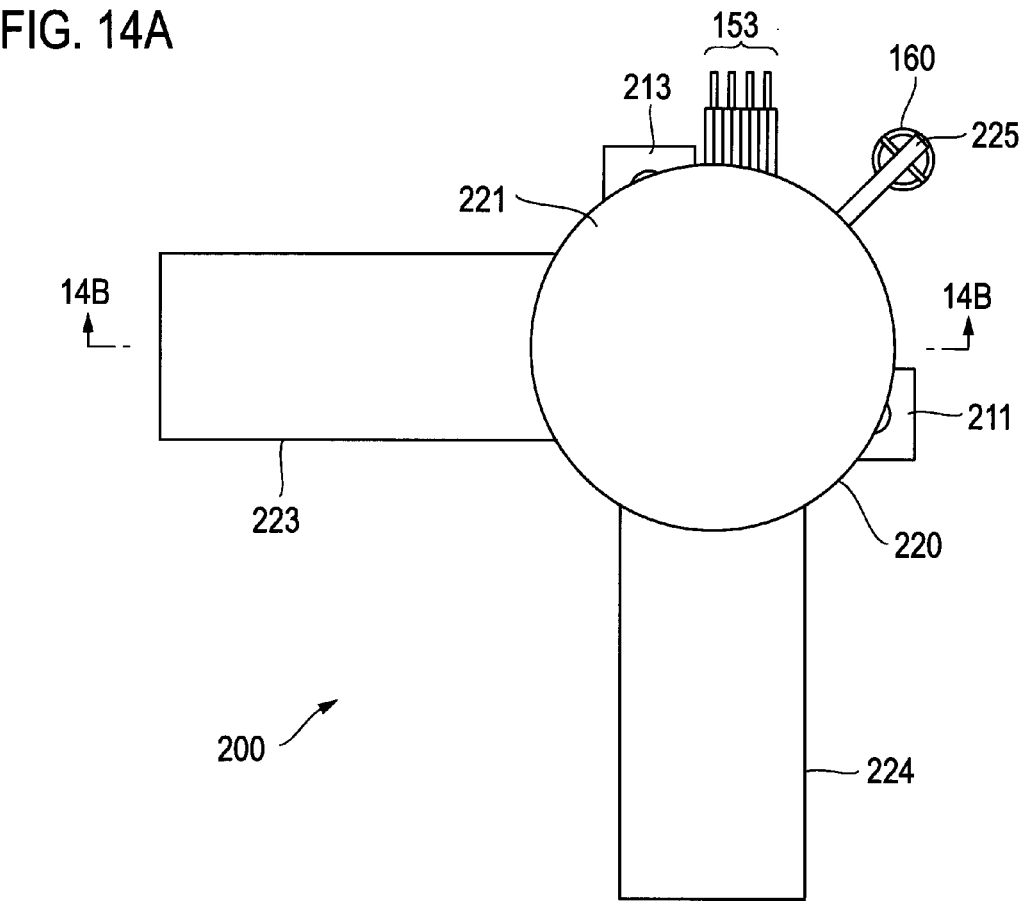
FIG. 14A is a plan view illustrating the sensing apparatus according to the second embodiment.
Figure 14B:
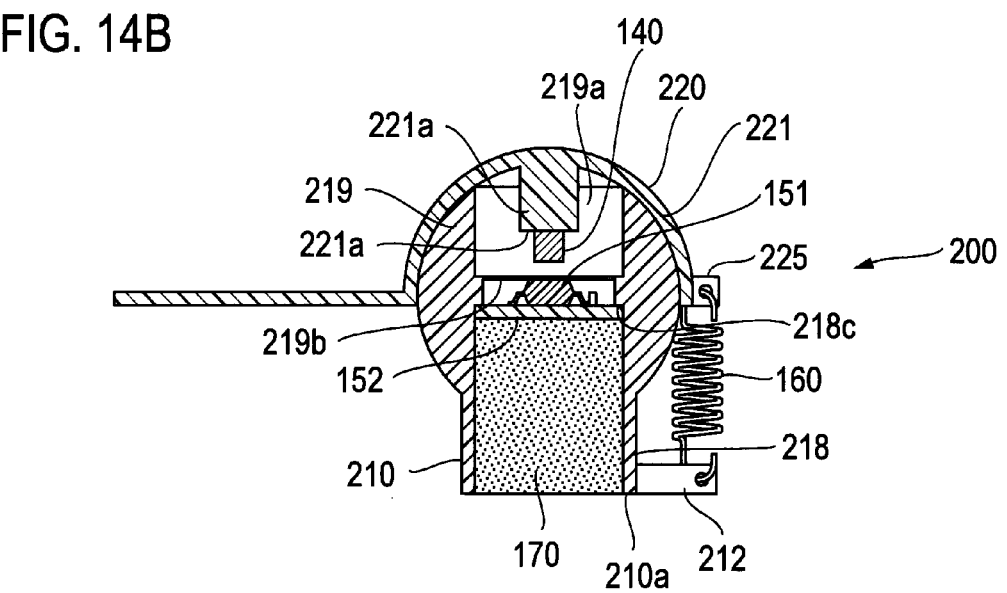
FIG. 14B is a cross-sectional view of section 14B-14B in FIG. 14A.
Figure 15:
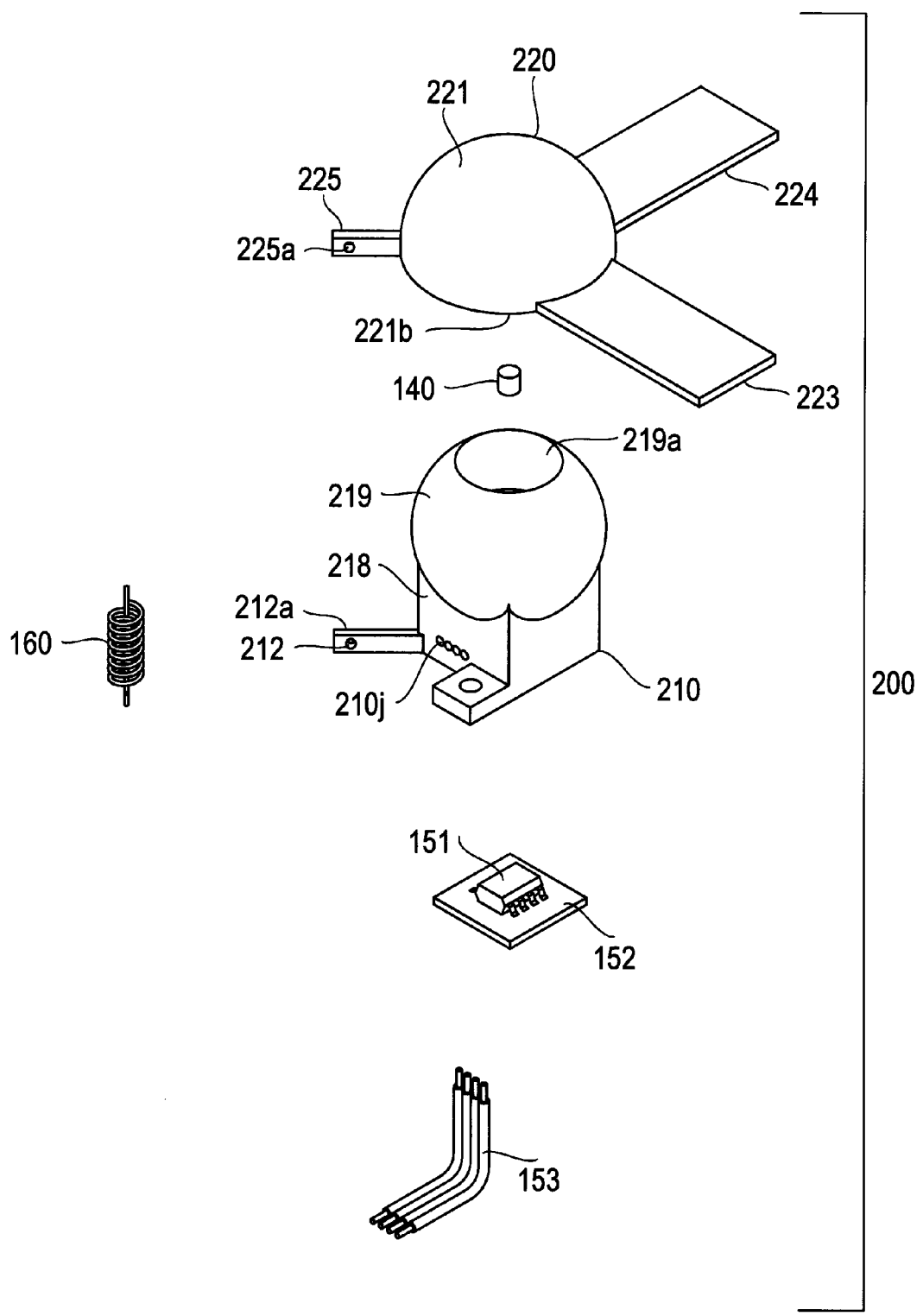
FIG. 15 is an exploded perspective view illustrating the sensing apparatus according to the second embodiment.

FIG. 12 is a perspective view illustrating a sensing apparatus 200 according to the second embodiment. FIG. 13A is a front elevational view illustrating the sensing apparatus 200 of the embodiment, FIG. 13B is a left side elevational view illustrating the sensing apparatus of the embodiment, and FIG. 13C is a back view illustrating the sensing apparatus 200 of the embodiment. FIG. 14A is a plan view illustrating the sensing apparatus 200 of the embodiment and FIG. 14B is a cross-sectional view of section 14B-14B in FIG. 14A. FIG. 15 is an exploded perspective view illustrating the sensing apparatus 200 according to the embodiment. In these figures, the components common to the first embodiment are indicated by the same reference numerals.

As shown in these figures, the sensing apparatus 200 according to the embodiment includes a base 210, a movable part 220, a magnet 140 (turning member), a sensor IC 151 (sensing element), a wiring board 152, lead wires 153, a spring 160 (elastic member), and a filling material 170.

[Base 210]

The base 210 of the embodiment, which is made of synthetic resin etc., has a substantially rectangular-column-shaped hollow mount 218, from which a sphere part 219, which is substantially spherical, extends (see FIGS. 14B, 15, etc.).

When the mount 218 is placed so that its bottom faces downward, a cylindrical hollow part 219a, only one end of which is open, is disposed on the upper part of the sphere part 219 (see FIG. 15 etc.).

A retaining part 218c projects inward from a side of the sphere part 219 within the mount 218 (see FIG. 14B etc.). As in the sensing apparatus 100 according to the first embodiment, a rectangular spring retainer 212 (first retainer), which projects outward from an edge of the mount 218, and spring retaining plates 211 and 213, which project from sides of the mount 218 in a direction substantially orthogonal to the sides, are disposed on an outer surface of the mount 218 near its end face 210a. A spring retaining hole 212a, a through hole, is formed in the spring retainer 212. Spring retaining holes 211a and 213a, through holes, are formed in the spring retaining plates 211 and 213, respectively. Through holes 210j, in which lead wires are passed, are formed in a side 210d.

[Movable Part 220]

The movable part 220 according to the embodiment, which is made of synthetic resin etc., has a hollow hemispherical cup 221, plate-like input units 223 and 224 (first and second input units) that project outward from an outer surface near an opening end 221b of the cup 221, and a plate-like spring retainer 225 (second retainer) that projects outward from an outer surface near the opening end 221b of the cup 221 (see FIGS. 14A, 15, etc.).

The input units 223 and 224 extend from the cup 221 outward so that input units 223 and 224 are orthogonal to each other on the same plane. The spring retainer 225 extends outward from the cup 221 in a direction substantially midway between the direction opposite to the extension direction of the input unit 223 and the direction opposite to the extension direction of the input unit 224. The physical relationship between the input unit 223, the input unit 224, and the spring retainer 225 is the same as the physical relationship between the input unit 123, the input unit 124, and the spring retainer 125 in the first embodiment. A spring retaining hole 225a, a through hole, is formed in the spring retainer 225.

A columnar projection 221a extends toward the center of the cup 221. The inside diameter of the cup 221 is slightly larger than the outside diameter of the sphere part 219 of the base 210 and the outside diameter of the projection 221a is smaller than the inside diameter of the hollow part 219a of the base 210. The cup 221 is placed on the surface of the sphere part 219 of the base 210 with the projection 221a placed in the hollow part 219a and the cup 221 and the sphere 219 constitute a ball joint. In the embodiment, the cup 221 is placed in a direction in which the movable part 220 turns about the straight line LE (third straight line) when a force is applied to a surface 223a of the input unit 223 in a direction substantially orthogonal to the surface 223a or the movable part 220 turns about the straight line LF (fourth straight line) when a force is applied to a surface 224a of the input unit 224 in a direction substantially orthogonal to the surface 224a.

The movable part 220 is rotatably supported by the base 210 with the above structure, so that at least a turn about the straight line LE (third straight line) and a turn about the straight line LF (fourth straight line) are possible (see FIG. 12 etc.).

The movable part 220 according to the embodiment can also turn about the straight line LA and turn about the straight line LB at the same time. Accordingly, the movable part 220 can tilt in any direction relative to a straight line OG2 that can be substantially orthogonal to the straight lines LE and LF. The straight line OG2 is determined relative to the base 210. For example, the straight line OG2 is a straight line substantially orthogonal to the straight lines LE and LF when a straight line substantially orthogonal to the straight lines LE and LF is orthogonal to the wiring board 152.

[Magnet 140]

The magnet 140 is attached to a tip face 221aa of the projection 221a within the cup 221 of the movable part 220. In the embodiment, either pole (south pole or north pole) of the magnet 140 is attached to the vicinity of the center of the tip face 221aa. The magnet 140, which turns together with the movable part 220, can be placed in the straight line OG2.

[Sensor IC 151, Wiring Board 152, Lead Wire 153, and Filling Material 170]

As in the first embodiment, the sensor IC 151 is mounted on one side of the wiring board 152 to which one end of each of the lead wires 153 is connected. The wiring board 152 of this type is placed within the mount 218 of the base 210 with the sensor IC 151 facing toward the magnet 140 (see FIGS. 14A and 15). The wiring board 152 is positioned within the mount 218 of the base 210 by the above retaining part 218c. Another end of each of the lead wires 153 passes through the through hole 210j disposed in the side of the mount 218 toward the outside of the mount 218. In this state, the mount 218 is filled with the filling material 170 to secure the wiring board 152. Accordingly, the sensor IC 151 is secured to the predetermined reference position of the base 210 and spaced apart from the magnet 140. The reference position of the embodiment is established in the straight line OG2.

[Spring 160]

The spring 160 is disposed between the base 210 and the movable part 220. The spring 160 of the embodiment is a coil spring (coil-shaped extension spring), both ends of which are bent to a hook or ring shape. One end of the spring 160 snaps into the spring retaining hole of the spring base 212 of the base 210 and the other end of the spring 160 snaps into the spring retaining hole 225a of the spring retainer 225 of the movable part 220 (see FIG. 12 etc.).

<Operation>

Figure 16:
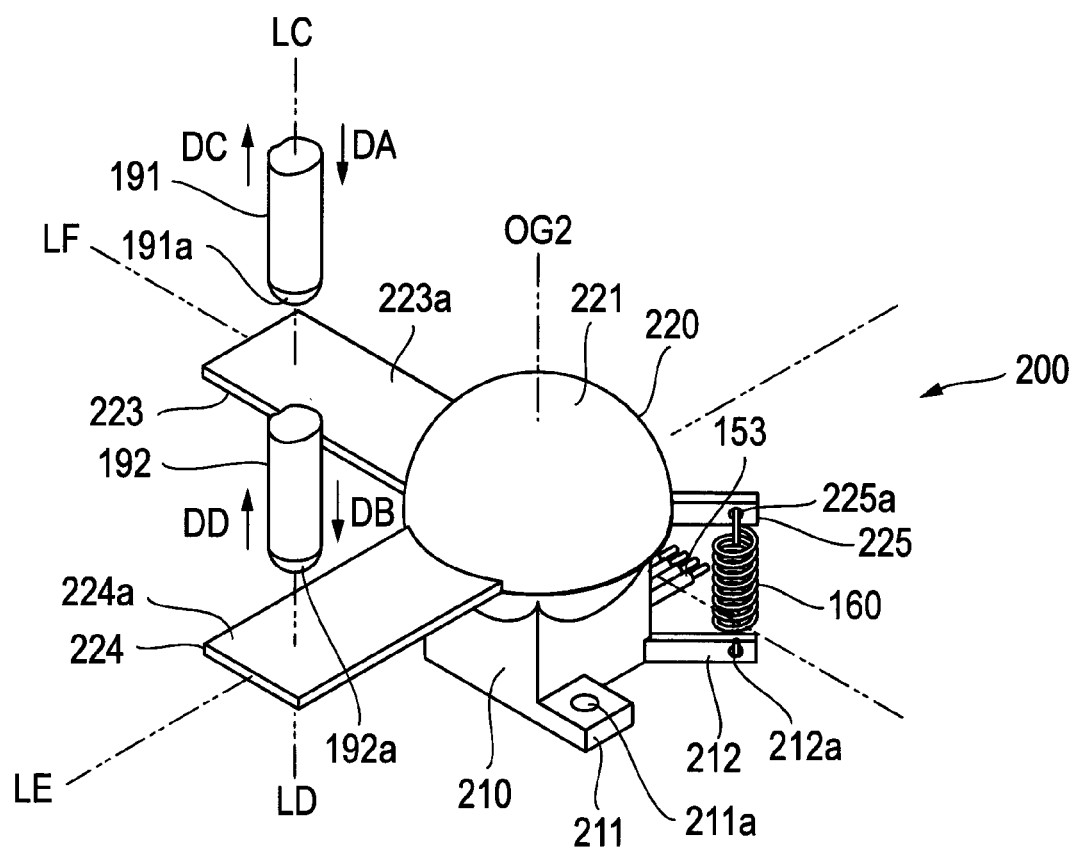
FIG. 16 is a diagram illustrating the operation of the sensing apparatus according to the second embodiment.

FIG. 16 describes the operation of the sensing apparatus 200 according to the second embodiment.

As shown in FIG. 16, when the sensing apparatus 200 according to the present invention is used, a tip 191a of an input shaft 191, which moves linearly in the direction of a straight line LC (first straight line), makes contact with one surface 223a of the input unit 223 of the sensing apparatus 200 and a tip 192a of an input shaft 192, which moves linearly in the direction of a straight line LD (second straight line), makes contact with one surface 224a of the input unit 224.

When the input shaft 191 moves linearly in the DA direction along the straight line LC and the tip 191a of the input shaft 191 applies a force in the DA direction (first direction) along the straight line LC, the movable part 220 turns in the DA direction about the straight line LE (third straight line). Accordingly, the spring 160 gives a reaction force against the turning of the movable part 220 in the DA direction about the straight line LE. That is, the spring 160 applies, to the movable part 220, a force in the direction opposite to the direction in which the movable part 220 turns when a force in the DA direction is applied to the input unit 223. This reaction force urges the tip 191a of the input shaft 191 in the DC direction, which is opposite to the DA direction, from the surface 223a along the straight line LC. This always brings the input shaft 191 into constant contact with the input unit 223 and, even when the input shaft 191 moves linearly in the DC direction along the straight line LC, the input unit 223 follows the linear displacement of the tip 191a and the movable part 220 turns in the DC direction about the straight line LE.

When the input shaft 192 moves linearly in the DB direction along the straight line LD and the tip 192a of the input shaft 192 applies a force in the DB direction (second direction) along the straight line LD, the movable part 220 turns in the DB direction about the straight line LF (fourth straight line). Accordingly, the spring 160 gives a reaction force against the turning of the movable part 220 in the DB direction about the straight line LF. That is, the spring 160 applies, to the movable part 220, a force in the direction opposite to the direction in which the movable part 220 turns when a force in the DB direction is applied to the input unit 224. This reaction force urges the tip 192a of the input shaft 192 in the DD direction, which is opposite to the DB direction, from the surface 224a of the input unit 224 along the straight line LD. This brings the input shaft 192 into constant contact with the input unit 224 and, even when the input shaft 192 moves linearly in the DD direction along the straight line LD, the input unit 224 follows the linear displacement of the tip 192a and the movable part 220 turns in the DD direction about the straight line LF.

When the input shaft 191 and 192 move linearly at the same time, the above turning operations of the movable part 220 are performed at the same time. In the embodiment, the straight lines LC and LD are substantially parallel to each other and the DA direction and the DB direction are substantially the same. The spring 160 applies a force including the direction components in the DA direction and the DB direction to the spring retainer 225. Since the spring retainers 212 and 225 and the spring 160 are placed in the above positions, the single spring 160 gives a reaction force against the turning of the movable part 220 in the DA direction about the straight line LE (third straight line) and a reaction force against the turning of the movable part 220 in the DB direction about the straight line LF (fourth straight line).

[Other Modifications]

Figure 17:
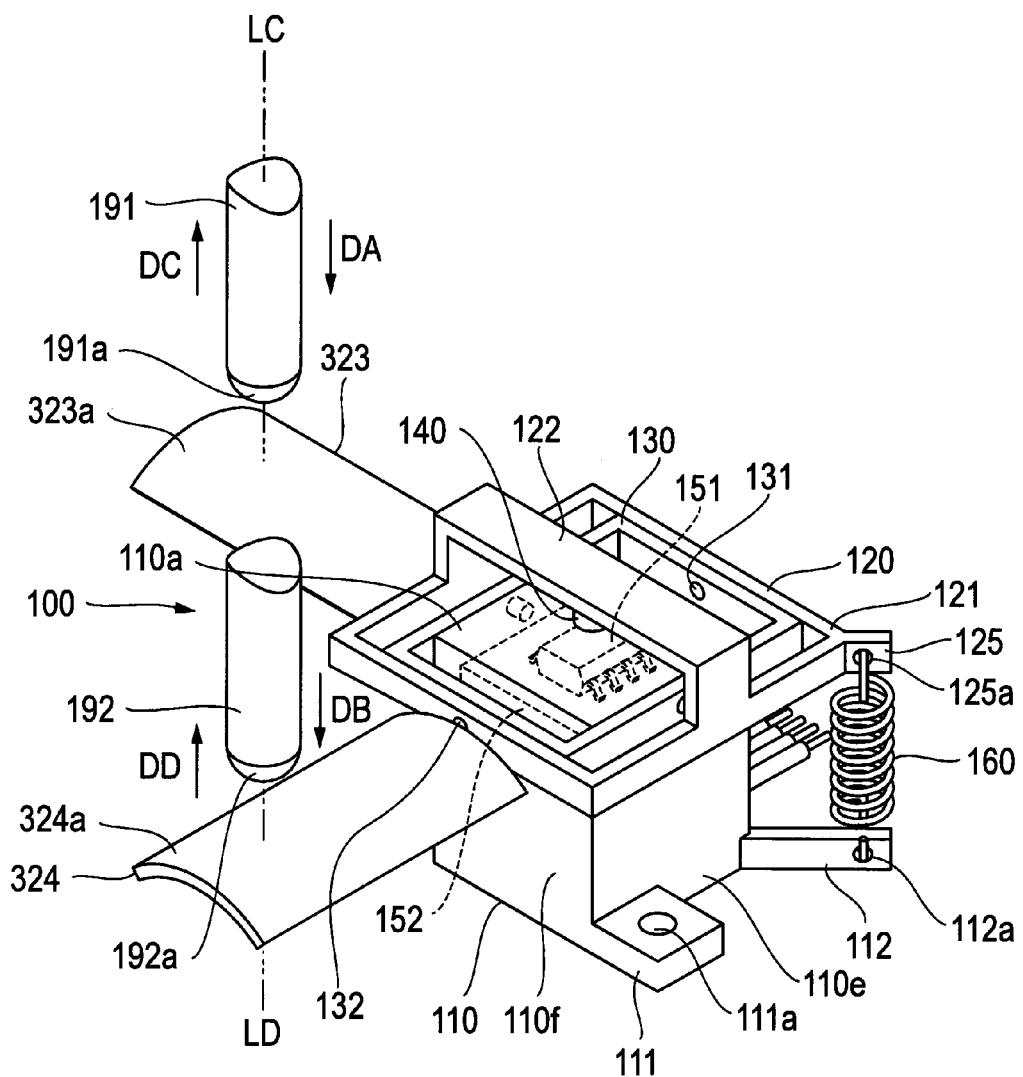
FIG. 17 is a diagram illustrating a modification.

The present invention is not limited to the above embodiments. For example, in the above embodiments, the input units 123 and 124 or the input units 223 and 224 are integrated with the movable part 120 or 220. However, the input units 123 and 124 or the input units 223 and 224 may be independent of the movable part 120 or the movable part 220, and the input units 123 and 124 or the input units 223 and 224 may be secured to the movable part 120 or the movable part 220. The input units 123 and 124 may be formed as one plate or the input units 223 and 224 may be formed as one plate. The input units 123 and 124 or the input units 223 and 224 may be wave-shaped, column-shaped, or spherical, not plate-shaped. In addition, as shown in FIG. 17, the input units 323 and 324 may be curved plates. In this example, the input units 323 and 324 are curved so that surfaces 323a and 324a become convex surfaces. In this case, when the movable part 120 turns based on the linear displacement of one of the input shafts, it is possible to prevent the turning operation from being limited by the other input shaft. In addition, the input units 123 and 124 or the input units 223 and 224 may extend upward from the movable part 120 or 220 (in a direction away from the base 110 or 210 along the straight line OG1 or OG2) or obliquely from the movable part 120 or 220 (in a direction away from the base 110 or 210 and between the straight line LB and LA and the straight line OG1 or between the straight line LF and LE and the straight line OG2). In addition, depressions disposed in a surface of the movable part 120 or 220 can be used as input units in place of the input units 123 and 124 or the input units 223 and 224 that project outward from the movable part 120 or 220.

The two input shafts 191 and 192 move mutually in parallel in the above embodiments, but the input shafts 191 and 192 may linearly move not in parallel. In addition, the two shafts 191 and 192 apply forces to the input units 123 and 124 or the input units 223 and 224 in the same direction in the above embodiments, but the two shafts 191 and 192 may apply forces to the input units 123 and 124 or the input units 223 and 224 in different directions.

The attachment position of the spring 160 is not limited to that specified in the above embodiments, any positions may be selected as long as the spring 160 can give the above reaction forces. In addition, a spring that gives the reaction force against the turning operation of the movable part 120 or 220 about the straight line LA or LE may be different from a spring that gives the reaction force against the turning operation of the movable part 120 or 220 about the straight line LB or LF. The spring 160, which is a coil-shaped extension spring, is used as the elastic member in the above embodiments, but other elastic members such as a compression spring, blade spring, or rubber may be used.

A universal joint between the input shaft 191 and the input unit 123 or 223 and a universal joint between the input shaft 192 and the input unit 124 or 224 may be used so that the input units 123 and 124 or the input units 223 or 224 can follow the linear displacement of the input shaft 191 or 192 without using a reaction force of the spring 160. In this case, no elastic member such as the spring 160 is necessary.

The magnet 140 is used as a turning member and the sensor IC 151, which senses the direction of a magnetic field line, is used as a sensing element in the above embodiments. However, as long as the mechanism can sense the turning direction of the turning member in response to the turning operation of the movable part 120 or 220, another sensing system that uses a light-emitting diode as the turning member and uses photoreceptor as the turning member may be used to sense the turning direction of the turning member.

It will be clear that various modifications may be made without departing from the spirit and scope of the invention. The present invention is applicable to side-view mirrors of a vehicle or an apparatus for two linear displacement operations with a 2-axis linear actuator in industrial machines etc.

What is claimed is:

1. A sensing apparatus for sensing a first linear displacement along a first straight line and a second linear displacement along a second straight line, which differs from the first straight line, the sensing apparatus comprising:
    a base;
    a movable part capable of performing at least a first turn and a second turn, the movable part being rotatably supported by the base, the first turn being a turn about a third straight line, the second turn being a turn about a fourth straight line substantially orthogonal to the third straight line;
    a first input unit placed so as to turn the movable part about the third straight line when a force along the first straight line is applied to the first input unit, the first input unit being part or all of a first member formed integrally with or secured to the movable part;
    a second input unit placed so as to turn the movable part about the fourth straight line when a force along the second straight line is applied to the second input unit, the second input unit being part or all of a second member formed integrally with or secured to the movable part;
    a turning member secured to the movable part, the turning member turning together with the movable part; and
    a sensing element that is secured to a reference position of the base, senses a direction of the turning member relative to the reference position, and outputs a signal determined on the basis of the detected direction to identify the first linear displacement and the second linear displacement.

2. The sensing apparatus according to claim 1, further comprising:
    a first retainer formed integrally with or secured to the base;
    a second retainer formed integrally with or secured to the movable part; and
    an elastic member having one end connected to the first retainer and another end connected to the second retainer;
    wherein a force in a first direction along the first straight line is applied to the first input unit and a force in a second direction along the second straight line is applied to the second input unit;
    wherein the movable part turns about the third straight line when the force in the first direction is applied to the first input unit and the movable part turns about the fourth straight line when the force in the second direction is applied to the second input unit; and
    wherein the elastic member applies, to the movable part, a force in a direction opposite to the direction in which the movable part turns when the force in the first direction is applied to the first input unit and/or a force in a direction opposite to the direction in which the movable part turns when the force in the second direction is applied to the second input unit.

3. The sensing apparatus according to claim 2, wherein the first straight line and the second straight line are substantially parallel to each other, the first direction is identical to the second direction, and the elastic member applies, to the movable part, both the force in the direction opposite to the direction in which the movable part turns when the force in the first direction is applied to the first input unit and the force in the direction opposite to the direction in which the movable part turns when the force in the second direction is applied to the second input unit.

4. The sensing apparatus according to claim 3, wherein the first member extends in a direction along the fourth straight line from the movable part, the second member extends in a direction along the third straight line from the movable part, the second retainer extends from the movable part in a direction that divides an angle formed by a direction opposite to the direction in which the first member extends and a direction opposite to the direction in which the second member extends, the elastic member applies, to the second retainer, a force including direction components identical to the first direction and the second direction.

5. The sensing apparatus according to claim 1, wherein the sensing element outputs an X-axis output signal value and a Y-axis output signal value as signals to identify the first linear displacement and the second linear displacement, the X-axis output signal value identifies an X-axis component of a direction component on an XY plane, the Y-axis output signal value identifies a Y-axis component of the direction component on the XY plane, the direction component corresponds to a projection, on the XY plane, of the direction of the turning member relative to the reference position, and the XY plane is substantially orthogonal to one straight line capable of being substantially orthogonal to the third straight line and the fourth straight line.

6. The sensing apparatus according to claim 5, wherein the first input unit is capable of being part or all of the first member extending along an X-axis of the XY plane, the second input unit is capable of being part or all of the member extending along a Y-axis of the XY plane, and the X-axis output signal identifies only the first linear displacement and the Y-axis output signal identifies only the second linear displacement.

7. The sensing apparatus according to claim 6, wherein the first member extends outward along the fourth straight line from the movable part and the second member extends outward along the third straight line from the movable part.

8. The sensing apparatus according to claim 5, wherein the reference position is located in a straight line determined relative to the base, the turning member is capable of being located in the straight line determined relative to the base, and a tilt direction and a tilt angle of a straight line passing through the turning member and the reference position relative to the straight line determined relative to the base vary depending on a turn of the movable part.

9. The sensing apparatus according to claim 1, wherein the first member extends outward along the fourth straight line from the movable part and the second member extends outward along the third straight line from the movable part.

10. The sensing apparatus according to claim 1, wherein the turning member is a magnet spaced apart from the sensing element and the sensing element is a magnetic sensor circuit with a sensing unit sensing a magnetic field generated by the magnet, the sensing element sensing a direction of the magnet relative to the reference position by sensing a direction in which a magnetic field line from the magnet passes through the sensing unit.

11. The sensing apparatus according to claim 1, wherein the reference position is located in a straight line determined relative to the base, the turning member is capable of being located in the straight line determined relative to the base, and a tilt direction and a tilt angle of a straight line passing through the turning member and the reference position relative to the straight line determined relative to the base vary depending on a turn of the movable part.

* * * * *